United States Patent
Ryaboy et al.

(10) Patent No.: US 6,619,611 B2
(45) Date of Patent: Sep. 16, 2003

(54) PNEUMATIC VIBRATION ISOLATOR UTILIZING AN ELASTOMERIC ELEMENT FOR ISOLATION AND ATTENUATION OF HORIZONTAL VIBRATION

(75) Inventors: Vyacheslav Ryaboy, Irvine, CA (US); Worthington B. Houghton, Jr., Newport Beach, CA (US); Herman B. Keil, Cypress, CA (US)

(73) Assignee: Newport Corporation, Irvine, CA (US)

( * ) Notice: Subject to any disclaimer, the term of this patent is extended or adjusted under 35 U.S.C. 154(b) by 0 days.

(21) Appl. No.: 09/898,410

(22) Filed: Jul. 2, 2001

(65) Prior Publication Data

US 2003/0001067 A1 Jan. 2, 2003

(51) Int. Cl.$^7$ .............................................. F16M 13/00
(52) U.S. Cl. ........................................ 248/631; 248/636
(58) Field of Search ................................ 248/631, 636, 248/566, 408.2, 161, 575

(56) References Cited

U.S. PATENT DOCUMENTS

| | | | |
|---|---|---|---|
| 1,143,165 A | 6/1915 | Begusch |
| 1,306,906 A | 6/1919 | Jaques, Sr. |
| 2,367,139 A | 1/1945 | Ress |
| 3,357,268 A | 12/1967 | Richter |
| 3,442,475 A | 5/1969 | Rivin |
| 3,460,786 A | 8/1969 | Rivin |
| 3,478,608 A | 11/1969 | Met |
| 3,533,012 A | 10/1970 | Johnson et al. |
| 3,565,515 A | 2/1971 | De Mey, II |
| 3,577,791 A | 5/1971 | Vanden Broek |
| 3,578,278 A | 5/1971 | Pickering |
| 3,601,476 A | 8/1971 | MacKenzie |
| 3,620,558 A | 11/1971 | MacMillan |
| 3,667,525 A | 6/1972 | Spieth |
| 3,751,025 A | 8/1973 | Beery et al. |
| 3,917,201 A | 11/1975 | Roll |
| 3,945,246 A | 3/1976 | Wadensten |
| 4,030,811 A | 6/1977 | Khoe et al. |
| 4,065,203 A | 12/1977 | Goell et al. |
| 4,079,404 A | 3/1978 | Comerford et al. |
| 4,088,396 A | 5/1978 | Edelstein |
| 4,119,363 A | 10/1978 | Camlibel et al. |
| 4,144,504 A | 3/1979 | Leggett et al. |
| 4,164,363 A | 8/1979 | Hsu |
| 4,167,744 A | 9/1979 | Nyul |
| 4,199,222 A | 4/1980 | Ikushima et al. |
| 4,237,474 A | 12/1980 | Ladany |

(List continued on next page.)

FOREIGN PATENT DOCUMENTS

| | | |
|---|---|---|
| CA | 2199423 | 3/1996 |
| GB | 2 124 402 A | 7/1982 |

(List continued on next page.)

OTHER PUBLICATIONS

J. M. Kahn, C. A. Burrus, and G. Raybon, High–Stability 1.5 um External–Cavity Semiconductor Lasers for Phase–Lock Applications, Photonics Technology Letters, vol. 1. No. 7, Jul. 1989.

P. Zorabedian and W. R. Trutna, Jr., "Interference–filter–tuned, alignment–stabilized, semiconductor external–cavity laser", 1988, Optical Society of America.

*Primary Examiner*—Ramon O. Ramirez
*Assistant Examiner*—A. Joseph Wujciak, III
(74) *Attorney, Agent, or Firm*—Irell & Manella LLP

(57) ABSTRACT

A vibration isolator that has an elastomer which couples a support plate to a piston. The elastomer can provide horizontal damping of a payload that is coupled to the support plate. The piston can move within a first housing inner chamber that is in fluid communication with a second housing inner chamber. The chambers are pressurized with air that can flow to dampen vertical movement of the piston. The vibration isolator of the present invention thus provides both vertical and horizontal damping without using any oils.

32 Claims, 2 Drawing Sheets

U.S. PATENT DOCUMENTS

| | | | |
|---|---|---|---|
| 4,268,113 A | 5/1981 | Noel, Jr. | |
| 4,295,152 A | 10/1981 | Khoe et al. | |
| 4,296,998 A | 10/1981 | Dufft | |
| 4,316,678 A | 2/1982 | F'Geppert | |
| 4,332,469 A | 6/1982 | Wendland | |
| 4,350,867 A | 9/1982 | Kinoshita et al. | |
| 4,355,323 A | 10/1982 | Kock | |
| 4,357,072 A | 11/1982 | Goodfellow et al. | |
| 4,387,956 A | 6/1983 | Cline | |
| 4,403,243 A | 9/1983 | Hakamada | |
| 4,435,037 A | 3/1984 | Abramson et al. | |
| 4,469,399 A | 9/1984 | Cowen et al. | |
| 4,469,929 A | 9/1984 | Rosen et al. | |
| 4,479,698 A | 10/1984 | Landis et al. | |
| 4,500,165 A | 2/1985 | Scholl et al. | |
| 4,506,108 A | 3/1985 | Kersch et al. | |
| 4,523,802 A | 6/1985 | Sakaguchi et al. | |
| 4,523,810 A | 6/1985 | Goss et al. | |
| 4,525,659 A | 6/1985 | Imahashi et al. | |
| 4,550,410 A | 10/1985 | Chenausky et al. | |
| 4,615,031 A | 9/1986 | Eales et al. | |
| 4,623,220 A | 11/1986 | Grabbe et al. | |
| 4,647,147 A | 3/1987 | Pikulski et al. | |
| 4,647,331 A | 3/1987 | Koury, Jr. et al. | |
| 4,657,429 A | 4/1987 | Morris | |
| 4,664,732 A | 5/1987 | Campbell et al. | |
| 4,673,244 A | 6/1987 | Miles | |
| 4,673,245 A | 6/1987 | Kling et al. | |
| 4,677,290 A | 6/1987 | Mitch | |
| 4,678,271 A | 7/1987 | Beaulieu | |
| 4,679,908 A | 7/1987 | Goodwin | |
| 4,701,013 A | 10/1987 | Jurczyszyn et al. | |
| 4,702,556 A | 10/1987 | Ishii et al. | |
| 4,708,429 A | 11/1987 | Clark et al. | |
| 4,714,315 A | 12/1987 | Krause | |
| 4,720,163 A | 1/1988 | Goodwin et al. | |
| 4,746,195 A | 5/1988 | Auracher et al. | |
| 4,747,657 A | 5/1988 | Chaoui et al. | |
| 4,748,632 A | 5/1988 | Preston | |
| 4,759,600 A | 7/1988 | Caron et al. | |
| 4,763,979 A | 8/1988 | Heywang | |
| 4,767,174 A | 8/1988 | Carenco et al. | |
| 4,768,759 A | * 9/1988 | Bellamy et al. | 267/140.1 |
| 4,773,730 A | 9/1988 | Sedlmayr | |
| 4,779,946 A | 10/1988 | Pimpinella et al. | |
| 4,779,959 A | 10/1988 | Saunders | |
| 4,782,223 A | 11/1988 | Suzuki | |
| 4,787,691 A | 11/1988 | Lorenzo et al. | |
| 4,800,262 A | 1/1989 | Lentine | |
| 4,807,750 A | 2/1989 | Ryder et al. | |
| 4,823,220 A | 4/1989 | Milster et al. | |
| 4,837,768 A | 6/1989 | Schmid | |
| 4,842,397 A | 6/1989 | Eisler | |
| 4,850,261 A | 7/1989 | Greene | |
| 4,850,671 A | 7/1989 | Finzel | |
| 4,854,667 A | 8/1989 | Ebata et al. | |
| 4,913,527 A | 4/1990 | Jessop | |
| 4,914,867 A | 4/1990 | Saito et al. | |
| 4,915,482 A | 4/1990 | Collins et al. | |
| 4,916,635 A | 4/1990 | Singer et al. | |
| 4,938,564 A | 7/1990 | Romero | |
| 4,966,474 A | 10/1990 | Geiger | |
| 4,978,910 A | 12/1990 | Knox et al. | |
| 4,988,159 A | 1/1991 | Turner et al. | |
| 4,988,165 A | 1/1991 | Ishii et al. | |
| 5,000,415 A | 3/1991 | Sandercock | |
| 5,044,719 A | 9/1991 | Nakamura | |
| 5,058,124 A | 10/1991 | Cameron et al. | |
| 5,062,012 A | 10/1991 | Maeda et al. | |
| 5,068,749 A | 11/1991 | Patel | |
| 5,077,747 A | 12/1991 | Hemmer et al. | |
| 5,132,824 A | 7/1992 | Patel et al. | |
| 5,138,496 A | 8/1992 | Pong | |
| 5,140,470 A | 8/1992 | Luecke | |
| 5,146,532 A | 9/1992 | Hodge | |
| 5,150,236 A | 9/1992 | Patel | |
| 5,172,160 A | 12/1992 | Van Eijk et al. | |
| 5,179,618 A | 1/1993 | Anton | |
| 5,183,350 A | 2/1993 | Kramer | |
| 5,189,725 A | 2/1993 | Bensel, III et al. | |
| 5,191,587 A | 3/1993 | Hanson et al. | |
| 5,194,993 A | 3/1993 | Bedzyk | |
| 5,214,735 A | 5/1993 | Henneberger et al. | |
| 5,218,258 A | 6/1993 | Shirasu et al. | |
| 5,218,610 A | 6/1993 | Dixon | |
| 5,219,051 A | 6/1993 | Davis | |
| 5,251,863 A | 10/1993 | Gossman et al. | |
| 5,285,995 A | 2/1994 | Gonzalez et al. | |
| 5,289,559 A | 2/1994 | Wilson | |
| 5,300,755 A | 4/1994 | Nishitani et al. | |
| 5,311,278 A | 5/1994 | Rosencher | |
| 5,319,435 A | 6/1994 | Melle et al. | |
| 5,321,539 A | 6/1994 | Hirabayashi et al. | |
| 5,327,061 A | 7/1994 | Gullapalli | |
| 5,337,383 A | 8/1994 | DeAngelis et al. | |
| 5,367,140 A | 11/1994 | Jonaneh et al. | |
| 5,410,145 A | 4/1995 | Coroy | |
| 5,428,225 A | 6/1995 | Silva et al. | |
| 5,428,635 A | 6/1995 | Zhiglinsky et al. | |
| 5,434,944 A | 7/1995 | Kerry et al. | |
| 5,434,945 A | 7/1995 | Burek et al. | |
| 5,446,519 A | 8/1995 | Makinouchi | |
| 5,460,357 A | * 10/1995 | Stewart | 267/294 |
| 5,463,647 A | 10/1995 | Pan | |
| 5,469,265 A | 11/1995 | Measures et al. | |
| 5,499,261 A | 3/1996 | Welch et al. | |
| 5,502,598 A | 3/1996 | Kimura et al. | |
| 5,528,718 A | 6/1996 | Ray et al. | |
| 5,530,547 A | 6/1996 | Arnold | |
| 5,530,785 A | 6/1996 | Sakamoto et al. | |
| 5,544,725 A | * 8/1996 | Handke et al. | 267/221 |
| 5,553,186 A | 9/1996 | Allen | |
| 5,558,189 A | * 9/1996 | Beck | 188/299 |
| 5,563,972 A | 10/1996 | Krausse et al. | |
| 5,564,537 A | 10/1996 | Shoureshi | |
| 5,570,444 A | 10/1996 | Janssen et al. | |
| 5,581,077 A | 12/1996 | Chirovsky et al. | |
| 5,598,500 A | 1/1997 | Crespel et al. | |
| 5,603,387 A | 2/1997 | Beard et al. | |
| 5,617,501 A | 4/1997 | Miller et al. | |
| 5,619,609 A | 4/1997 | Pan et al. | |
| 5,638,267 A | 6/1997 | Singhose et al. | |
| 5,638,482 A | 6/1997 | Winterhoff et al. | |
| 5,653,317 A | 8/1997 | Wakui | |
| 5,655,045 A | 8/1997 | Morlion et al. | |
| 5,660,255 A | 8/1997 | Schubert et al. | |
| 5,668,906 A | 9/1997 | Yamamura et al. | |
| 5,673,350 A | 9/1997 | Song et al. | |
| 5,689,607 A | 11/1997 | Vincent et al. | |
| 5,717,804 A | 2/1998 | Pan et al. | |
| 5,725,066 A | * 3/1998 | Beard et al. | 180/89.12 |
| 5,737,132 A | 4/1998 | Luecke et al. | |
| 5,745,633 A | 4/1998 | Giebel et al. | |
| 5,748,821 A | 5/1998 | Schempp et al. | |
| 5,751,877 A | 5/1998 | Ishizaka et al. | |
| 5,757,561 A | 5/1998 | Sechrist et al. | |
| 5,758,004 A | 5/1998 | Alarcon et al. | |
| 5,761,360 A | 6/1998 | Grois et al. | |
| 5,765,800 A | 6/1998 | Watanabe et al. | |
| 5,774,614 A | 6/1998 | Gilliland et al. | |
| 5,793,920 A | 8/1998 | Wilkins et al. | |

| | | |
|---|---|---|
| 5,793,921 A | 8/1998 | Wilkins et al. |
| 5,794,912 A | 8/1998 | Whittaker et al. |
| 5,812,958 A | 9/1998 | Mayama |
| 5,823,307 A | 10/1998 | Schubert et al. |
| 5,825,558 A | 10/1998 | Farmiga et al. |
| 5,852,519 A | 12/1998 | Do et al. |
| 5,880,894 A | 3/1999 | Blakley |
| 5,909,324 A | 6/1999 | Bryant et al. |
| 5,930,057 A | 7/1999 | Sechrist et al. |
| 5,941,920 A | 8/1999 | Schubert |
| 5,946,023 A | 8/1999 | Blanding |
| 5,963,695 A | 10/1999 | Joyce |
| 6,016,230 A | 1/2000 | Nunnally et al. |
| 6,022,005 A | 2/2000 | Gran et al. |
| 6,198,580 B1 | 3/2001 | Dallakian |
| 6,209,841 B1 * | 4/2001 | Houghton, Jr. et al. ..... 248/550 |

FOREIGN PATENT DOCUMENTS

| | | |
|---|---|---|
| GB | 2 131 971 A | 6/1984 |
| JP | 03021894 | 1/1991 |
| JP | 08088167 | 9/1994 |
| JP | 09330875 | 6/1996 |
| JP | 10144601 | 11/1996 |

OTHER PUBLICATIONS

A. Schremer and C. L. Tang, "Single–Frequency tunable external–cavity semiconductor laser using an electro–optic birefringent modulator", Appl. Phys. Lett., vol. 55, No. 1, Jul. 3, 1989.

M. W. Maeda, J. S. Patel, D. A. Smith, Chinlon Lin, M. A. Saifi, and A. Von Lehman, "An Electronically Tunable Fiber Laser with a Liquid–Crystal Etalon Filter as the Wavelength– Tuning Element", IEEE Photonics Technology Letters, vol. 2, No. 11, Nov. 1990.

Katsuhiko Hirabayashi, Hiroyuki Tsuda, and Takashi Kurokawa, "Tunable Liquid–Crystal Fabry–Perol Interferometer Filter for Wavelength–Division Multiplexing Communication Systems", Journal of Lightwave Technology, vol. 11, No. 12, Dec. 1993.

Stephen R. Mallinson, "Wavelength–selective filters for single–mode fiber WDM systems using Fabry–Perot interferometers", Applied Optics, vol. 26, No. 3, Feb. 1, 1987.

W. Gunning, J. Pasko, J. Tracy, "A liquid crystal tunable spectral filter: visible and infrared operation", SPIE vol. 268 Imaging Spectroscopy (1981).

Hiroyuki Tsuda, Katsuhiko Hirabayashi, Yuichi Tohmori, and Takashi Kurokawa, "Tunable Light Source Using a Liquid–Crystal Fabry–Perot Interferometer", IEEE Photonics Technology Letters, vol. 3. No. 6. Jun. 1991.

John R. Andrews, "Low Voltage Wavelength Tuning of an External Cavity Diode Laser Using a Nematic Liquid Crystal–Containing Birefringent Filert", IEEE Photonics Technology Letters. vol. 2, No. 5, May 1990.

N. A. Olsson and J. P. Van Der Ziel, "Performance Characteristics of 1.5–um External Cavity Semiconductor Lasers for Coherent Optical Communication", Journal Of Lightwave Technology, vol. LT–5. No. 4, Apr. 1987.

Hecht Optics Second Edition, Eugene Hecht, reprinted 1990, reference text pp. 303 # 368.

Rivin, Eugene I., "Vibration isolation of precision equipment", Precision Engineering, 1995, pp. 41–56, vol. 17.

"Marsh Mellow Springs Vibration Isolation Design Manual", 1998, Firestone Industrial Products Company.

Rivin, Eugene I., "Shaped Elastomeric Components for Vibration Control Devices", Sound and Vibration, Jul. 1999, pp. 18–23, vol. 33, No. 7.

* cited by examiner

PNEUMATIC VIBRATION ISOLATOR UTILIZING AN ELASTOMERIC ELEMENT FOR ISOLATION AND ATTENUATION OF HORIZONTAL VIBRATION

BACKGROUND OF THE INVENTION

1. Field of the Invention

The present invention relates to a vibration isolator that can dampen payload movement in both vertical and horizontal directions.

2. Background Information

Vibration isolators are used to isolate and damp vibration loads on an adjoining structure that is commonly referred to as a payload. The payload may be a table that is part of a semiconductor wafer fabrication system. The payload may be subjected to shock/vibration loads in both a vertical direction and a horizontal direction. For this reason vibration isolators are designed to dampen energy applied in both the vertical and horizontal directions.

U.S. Pat. No. 3,784,146 issued to Matthews discloses a vibration isolator which contains a piston that is coupled to a support plate by a plurality of cables. The piston is located within an air cylinder that can dampen vertical shock/vibration loads applied by the payload.

The cables allow the support plate to move within an inner cavity of the piston. The piston inner cavity includes a damping fluid that dampens shock/vibration loads applied in the horizontal direction.

It has been found that the damping oil will sometimes leak, thereby requiring a repair or replacement of the vibration isolator. Leaking fluid may therefore reduce the effective life of the isolator. Additionally, having to seal and charge a vibration isolator with damping fluid increases the cost of mass producing the isolator.

BRIEF SUMMARY OF THE INVENTION

One embodiment of the present invention includes a vibration isolator that has an elastomer, which couples a support plate to a piston. The piston can move within an inner chamber of an isolator housing.

DETAILED DESCRIPTION OF THE PREFERRED EMBODIMENT

The applicants disclose a vibration isolator that has an elastomer, which couples a support plate to a piston. The elastomer can provide horizontal damping of a payload that is coupled to the support plate. The vibration isolator does not require the cables and damping fluid typically found in isolators of the prior art. The piston can move within a first housing inner chamber that is in communication with a second housing inner chamber. The chambers are pressurized with air that can flow to dampen vertical movement of the piston. The vibration isolator of the present invention thus provides both vertical and horizontal damping without using any oil. Additionally, the elastomer provides high damping, short settling time, and a "soft" stop of payload motion.

Figure 1:
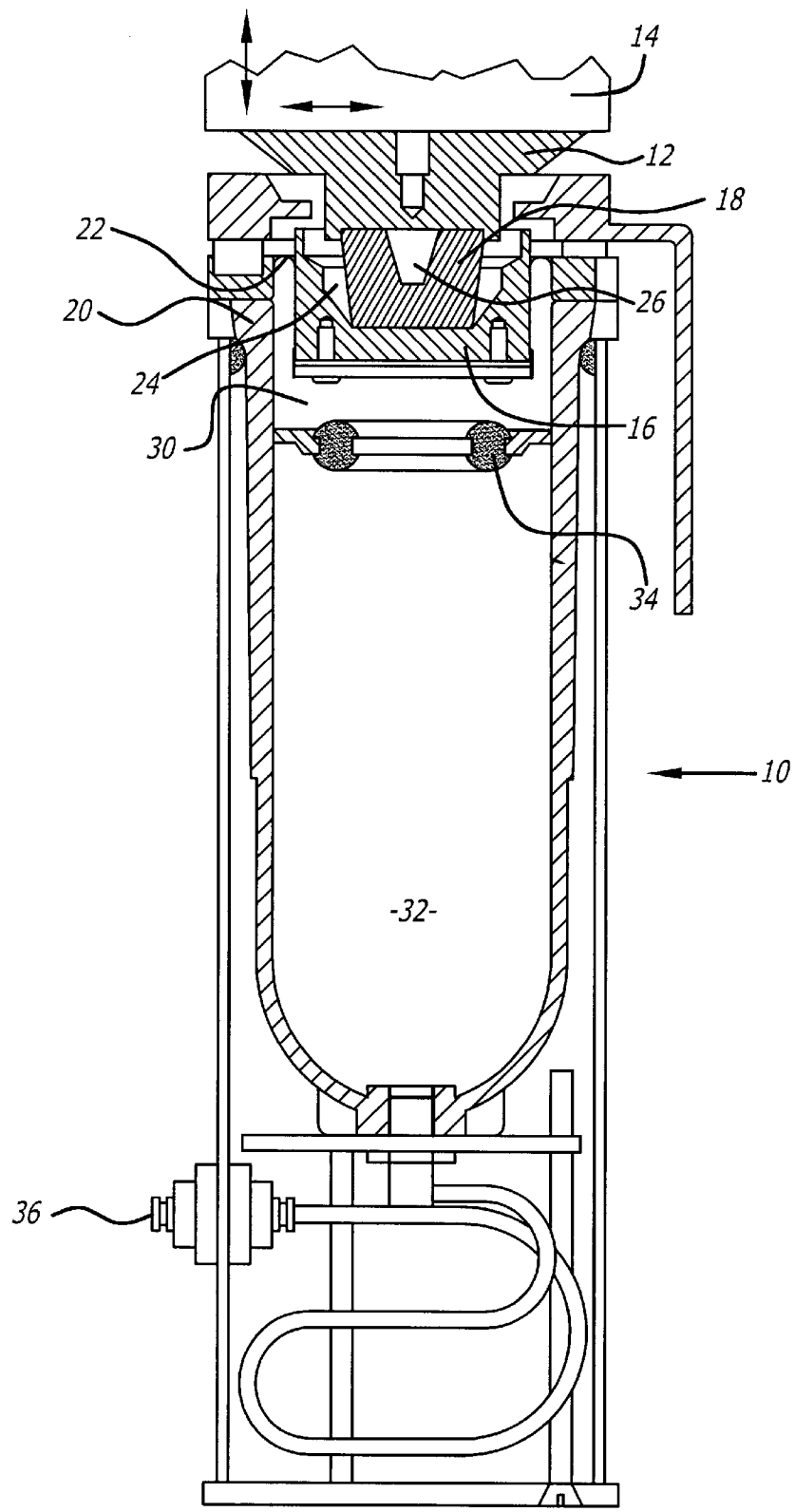
FIG. 1 is a cross-sectional view of an embodiment of a vibration isolator of the present invention.

Referring to the drawings more particularly by reference numbers, FIG. 1 shows an embodiment of a vibration isolator 10 of the present invention. The isolator 10 includes a support plate 12 that is coupled to a payload 14. The payload 14 may be any structure that is to be isolated such as an optical bench or the base of an x-y table. The payload 14 may move in a vertical direction or a horizontal direction as indicated by the arrows.

The support plate 12 is coupled to a piston 16 by an elastomer 18. The piston 16 is coupled to an isolator housing 20 by a diaphragm 22. The elastomer 18 is constructed to be smaller than an inner cavity 24 of the piston 16 to allow elastomer deflection when the payload 14 moves in a horizontal direction.

The elastomer 18 is typically constructed from a rubber or other damping material that will dissipate energy transmitted from the payload 14 into the support plate 12. Elastomeric materials may have a higher damping coefficient and a faster settling time than oil damping fluid. Additionally, the elastomer 18 has a higher shear stiffness that will provide a "soft" stop for the payload. The elastomer 18 is also stiff enough to withstand shock loads applied in the vertical direction.

It is desirable to provide an elastomer 18 that does not buckle under certain vertical loads. To increase the buckling load the elastomer 18 may have a conical shape. The narrow portion of the elastomer 18 may be attached to the top surface of the piston inner cavity 24. This allows the elastomer 18 to sit deeper into the inner cavity 24 and improves the stability of the system. Although a conical shape is shown and described, it is to be understood that the elastomer 18 may have other shapes such as cylindrical, rectangular or square. These shapes are not an exhaustive list of the elastomer profiles. To decrease stiffness the elastomer 18 may also have an inner cavity 26. The elastomer 18 shown in FIG. 1 also described in U.S. Pat. No. 6,398,407 Apr. 22, 2003, which is hereby incorporated by reference. Although an embodiment showing the narrow portion of the elastomer 18 attached to the piston 16 is shown and described, the wider portion of the elastomer 18 may be attached to the piston 16.

Figure 2:
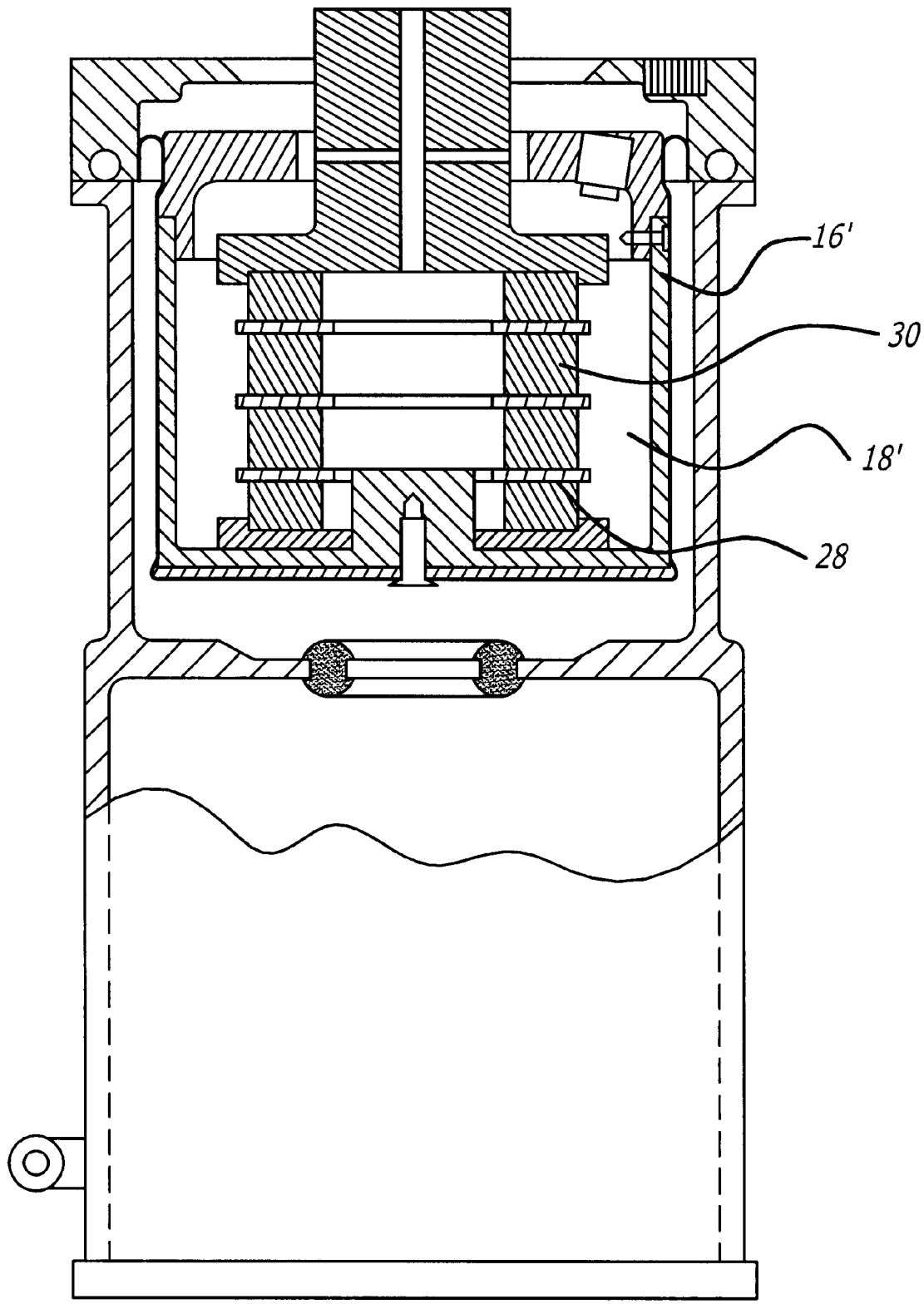
FIG. 2 is a cross-sectional view of an alternate embodiment of the vibration isolator.

FIG. 2 shows an alternate embodiment of the vibration isolator 10' wherein the elastomer 18' has a laminated construction. The laminated elastomer 18' may have a plurality of metal plates 28 that separate a number of damping layers 30. The damping layers 30 are constructed from a damping material such as rubber. The laminated structure has higher load capacity and vertical stiffness, as well as high rotational (tilt) stiffness, which improves the stability of the system, whereas the isolation in the horizontal direction remains good due to low stiffness of elastomeric layers in the horizontal (shear) direction.

Referring to FIG. 1, the piston 16 can move within a first inner chamber 30 of the isolator housing 20. The first inner chamber 30 is in communication with a second inner chamber 32 of the housing 30 through an orifice 34. The inner chambers 30 and 34 are pressurized with air at a pressure greater than atmospheric pressure through a leveling port 36.

Vertical movement of the payload 14 will move the piston 16 within the first inner chamber 30. The piston movement will induce air flow between the first 30 and second 32 chambers through the valve 34. The air flow absorbs and dampens energy transferred from the payload 14. The vibration isolator 10 of the present invention is thus able to dampen energy in both the vertical and horizontal directions.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A vibration isolator, comprising:
   a housing which has a first inner chamber;
   a piston that can move within said first inner chamber of said housing;
   a diaphragm coupled to said piston and said housing;
   a support plate; and,
   an elastomer that is attached to and contiguous with said support plate and attached to said piston.

2. The vibration isolator of claim 1, wherein said elastomer has a conical shape.

3. The vibration isolator of claim 1, wherein said elastomer has an inner cavity.

4. The vibration isolator of claim 1, wherein said elastomer includes a plurality of plates and a plurality of damping layers.

5. The vibration isolator of claim 1, further comprising a valve that provides fluid communication between a second inner chamber and said first inner chamber.

6. The vibration isolator of claim 5, wherein said first and second inner chambers contain a pressurized air.

7. The vibration isolator of claim 1, wherein said elastomer can be deflected within an inner cavity of said piston.

8. A vibration isolator, comprising:
   a housing which has a first inner chamber;
   a piston that can move within said first inner chamber of said housing;
   a diaphragm coupled to said piston and said housing;
   a support plate; and,
   coupling means for attaching said support plate directly to said piston.

9. The vibration isolator of claim 8, wherein said coupling means includes an elastomer.

10. The vibration isolator of claim 9, wherein said elastomer has a conical shape.

11. The vibration isolator of claim 9, wherein said elastomer has an inner cavity.

12. The vibration isolator of claim 9, wherein said elastomer includes a plurality of plates, and a plurality of damping layers.

13. The vibration isolator of claim 9, wherein said elastomer can be deflected within an inner cavity of said piston.

14. The vibration isolator of claim 8, further comprising an orifice that provides fluid communication between a second inner chamber and said first inner chamber.

15. The vibration isolator of claim 14, wherein said first and second inner chambers contain a pressurized air.

16. A method for damping a payload coupled to a support plate of a vibration isolator, comprising:
   moving the payload in a horizontal direction, which movement deflects an elastomer that is attached to and contiguous with a support plate and attached to a piston, the piston being coupled to a housing by a diaphragm.

17. The method of claim 16, further comprising moving the payload in a vertical direction wherein the piston moves within a first inner housing chamber to induce flow of air into a second inner housing chamber.

18. A vibration isolator, comprising:
   a housing which has a first inner chamber;
   a piston that has an inner cavity and can move within said first inner chamber of said housing;
   a support plate; and,
   an elastomer that is attached to and contiguous with said support plate and attached to said inner cavity of said piston.

19. The vibration isolator of claim 18, wherein said elastomer has a conical shape.

20. The vibration isolator of claim 18, wherein said elastomer has an inner cavity.

21. The vibration isolator of claim 18, wherein said elastomer includes a plurality of plates and a plurality of damping layers.

22. The vibration isolator of claim 18, further comprising a valve that provides fluid communication between a second inner chamber and said second inner chamber.

23. The vibration isolator of claim 22, wherein said first and second inner chambers contain a pressurized air.

24. A vibration isolator, comprising:
   a housing which has a first inner chamber;
   a piston that has an inner cavity and can move within said first inner chamber of said housing;
   a support plate; and,
   coupling means for attaching said support plate directly to inner cavity of said piston.

25. The vibration isolator of claim 24, wherein said coupling means includes an elastomer.

26. The vibration isolator of claim 25, wherein said elastomer has a conical shape.

27. The vibration isolator of claim 25, wherein said elastomer has an inner cavity.

28. The vibration isolator of claim 25, wherein said elastomer includes a plurality of plates, and a plurality of damping layers.

29. The vibration isolator of claim 24, further comprising an orifice that provides fluid communication between a second inner chamber and said second inner chamber.

30. The vibration isolator of claim 29, wherein said first and second inner chambers contain a pressurized air.

31. A method for damping a payload coupled to a support plate of a vibration isolator, comprising:
   moving the payload in a horizontal direction, which movement deflects an elastomer that is attached to and contiguous with a support plate and attached to an inner cavity of a piston.

32. The method of claim 31, further comprising moving the payload in a vertical direction wherein the piston moves within a first inner housing chamber to induce flow of air into a second inner housing chamber.

* * * * *